United States Patent [19]

Tanaka et al.

[11] 4,291,888
[45] Sep. 29, 1981

[54] ROTOR SHAFT SEALING MECHANISM IN SYNTHETIC RESIN KNEADING MACHINES OR EXTRUDERS

[75] Inventors: Takehiko Tanaka, Nishinomiya; Masahide Kanzawa, Kobe, both of Japan

[73] Assignee: Kobe Steel, Limited, Kobe, Japan

[21] Appl. No.: 115,049

[22] Filed: Jan. 24, 1980

[51] Int. Cl.³ .............................. F16J 9/04; F16J 15/38
[52] U.S. Cl. ........................................ 277/65; 277/66; 277/85; 277/106; 277/126; 277/167; 277/203
[58] Field of Search ...................... 277/38, 39, 40, 41, 277/65, 66, 81 R, 82, 85, 87, 94, 106, 116.2, 123, 126, 141, 142, 147, 167, 167.3, 203, 214, 24

[56] References Cited

U.S. PATENT DOCUMENTS

| | | |
|---|---|---|
| 2,131,927 | 10/1938 | Wenzell . |
| 2,293,505 | 8/1942 | Hillier . |
| 2,494,887 | 1/1950 | Lenhart . |
| 2,553,750 | 5/1951 | Cole . |
| 2,802,679 | 8/1957 | Taltavall . |
| 3,119,149 | 1/1964 | Nelson . |
| 3,218,085 | 11/1965 | Grace .............................. 277/65 X |
| 3,253,300 | 5/1966 | Gove et al. . |
| 3,300,811 | 1/1967 | Berger . |
| 3,364,523 | 1/1968 | Schippers . |
| 3,472,522 | 10/1969 | Winfrey .......................... 277/65 X |
| 3,497,582 | 2/1970 | Pettersson . |
| 3,680,994 | 8/1972 | Longenecker . |
| 3,700,247 | 10/1972 | Butler et al. . |
| 3,752,489 | 8/1973 | Latinen . |
| 3,784,339 | 1/1974 | Springfeld . |
| 3,841,814 | 10/1974 | Eckhardt . |
| 3,937,477 | 2/1976 | Gyory .............................. 277/65 X |
| 3,945,620 | 3/1976 | Ruegg . |
| 3,945,621 | 3/1976 | Hertog et al. . |
| 3,953,038 | 4/1976 | Ludwig ............................ 277/41 X |
| 3,976,285 | 8/1976 | Johnson . |
| 4,058,298 | 11/1977 | Duska et al. . |
| 4,075,712 | 2/1978 | Geyer . |

FOREIGN PATENT DOCUMENTS

| | | | |
|---|---|---|---|
| 756725 | 9/1956 | United Kingdom ................. | 277/65 |
| 904256 | 8/1962 | United Kingdom ................. | 277/85 |

Primary Examiner—Robert S. Ward, Jr.
Attorney, Agent, or Firm—Oblon, Fisher, Spivak, McClelland & Maier

[57] ABSTRACT

A rotor shaft sealing mechanism for a synthetic resin kneading machine is disclosed. The rotor shaft sealing mechanism includes a reverse screw member, a gland packing and a spring loaded compression member so that the three separate sealing means may act to seal the rotor shaft and prevent leakage of material. The sliding seal surfaces are separated from the mixing chamber so that particles produced by the wear thereof can be completely prevented from getting into the mixing chamber. The sealing surfaces are constructed of dry seals which prevents oil pollution in the chamber. The gland packing and compression member are resiliently held on to the rotor shaft by a retaining member which is resiliently connected to a support.

3 Claims, 4 Drawing Figures

ROTOR SHAFT SEALING MECHANISM IN SYNTHETIC RESIN KNEADING MACHINES OR EXTRUDERS

BACKGROUND OF THE INVENTION

1. Field of the Invention

This device relates to a rotor shaft sealing mechanism for synthetic resin material kneading machines or extruders. More particularly it relates to an improved rotor shaft end sealing mechanism in continuous kneading machines or extruders in which raw materials such as rubber and plastics continuously supplied through the inlet at one end of the machine are kneaded while they move past the mixing chamber toward the outlet at the other end by the internal pressure developed in the mixing chamber.

2. Description of the Prior Art

A reverse screw type shaft sealing mechanism (FIG. 1), a gland packing type shaft sealing mechanism (FIG. 2) and a spring-loaded type shaft sealing mechanism (FIG. 3) have been proposed as the rotor shaft end sealing mechanism in kneading machines for rubber and plastic materials.

The reverse screw type shaft sealing mechanism, as shown in FIG. 1, has a construction such that a mixing rotor installed in a mixing chamber 1 of the kneading machine has its end 2a threaded with reverse screw 3. In this type of shaft sealing mechanism, when powder is used as the mixed material, it is very likely to leak out by the pulsating pressure developed in the mixing chamber 1. This mechanism also has the drawback that when the viscosity of the melted material becomes low, the melted material is likely to leak out.

These disadvantages are considered to result from the reverse screw being designed to seal highly viscous melted materials.

The gland packing type shaft sealing mechanism, shown in FIG. 2, has a construction such that the rotor shaft 2 installed in the mixing chamber 1 of the kneading machine has around its shaft end 2a, gland packing materials 4 which are received in a housing member 5 and are held secured by a retainer member 7 bolted into the housing 5 by fixing element 6. In this sealing mechanism, the gland packing material 4 can only serve as a stuffing material and does not provide a sufficient seal against highly viscous materials, so that leaks will occur a short time after the machine has begun operating. This type of sealing mechanism also has the disadvantage that the gland packing material 4 does not have sufficient flexibility to follow the deflections of the rotor shaft 2.

The spring-loaded type shaft sealing mechanism, shown in FIG. 3, has a construction such that the rotor shaft 2 installed in the mixing chamber 1 has around its end 2a a ring 8 which presses against the end surface 2b of the rotor shaft 2. This construction has the drawback that the metallic members slide against each other thereby producing metal particles which may get into the mixing chamber and pollute the material being kneaded. In some cases, lubricating oil is used for the sliding portions to eliminate this problem (at arrow). However, this poses still another serious problem; that is, the lubricating oil itself will get into the mixing chamber and pollute the material being kneaded.

Though not shown in the drawings, there has also been proposed a shaft sealing mechanism which is the combination of the reverse screw type shaft sealing mechanism and the gland packing type shaft sealing mechanism. This mechanism can prevent the leakage of powder to some extent. However, the material that has leaked through the reverse screw portion cannot be prevented from leaking further by the gland packings.

As can be seen in the foregoing, the conventional shaft sealing mechanisms have drawbacks, and it is desirable to provide a shaft sealing mechanism which incorporates the following features.

(A) The sealing mechanism is capable of sealing both powdered material such as rubber and plastic and melted material of high viscosity.

(B) The sealing portion of the sealing mechanism is not subject to pulsating pressure.

(C) The sealing mechanism can prevent the pollution of the material being kneaded by foreign substance getting into the mixing chamber.

(D) The sealing mechanism is flexible enough to follow the deflection of the rotor shaft.

SUMMARY OF THE INVENTION

The present device has been constructed to overcome the above-mentioned drawbacks encountered in the conventional shaft sealing mechanisms and to provide an improved shaft sealing mechanism which incorporates the features enumerated above and which can be manufactured and assembled easily. A rotor shaft sealing mechanism for synthetic resin kneading machines or extruders comprises a reverse screw member mounted on the outer surface of the rotor shaft end, the reverse screw member having a reverse screw portion of a predetermined length. A housing member is secured around the reverse screw portion of the reverse screw member by a supporting member. A gland packing material is mounted on that portion of the outer surface of the reverse screw member on which no reverse screw is formed, the gland packing material being held in place by a holder fastened to a retaining member. And a resilient member is installed in the supporting member for resiliently connecting the supporting member and the retaining member.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DETAILED DESCRIPTION OF THE PREFERRED EMBODIMENTS

Figure 1:
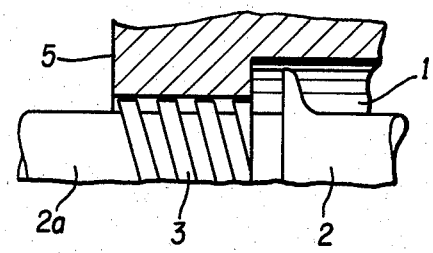
FIGS. 1 through 3 are enlarged views showing the essential portion of conventional shaft sealing mechanisms.
Figure 2:
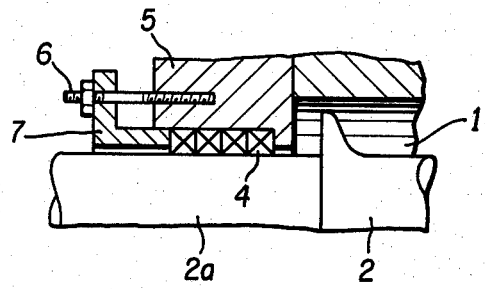
Figure 3:
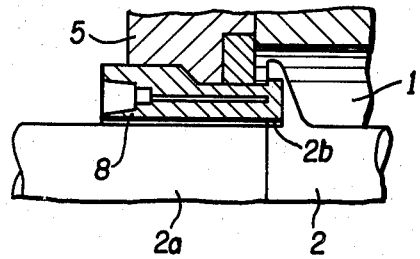
Figure 4:
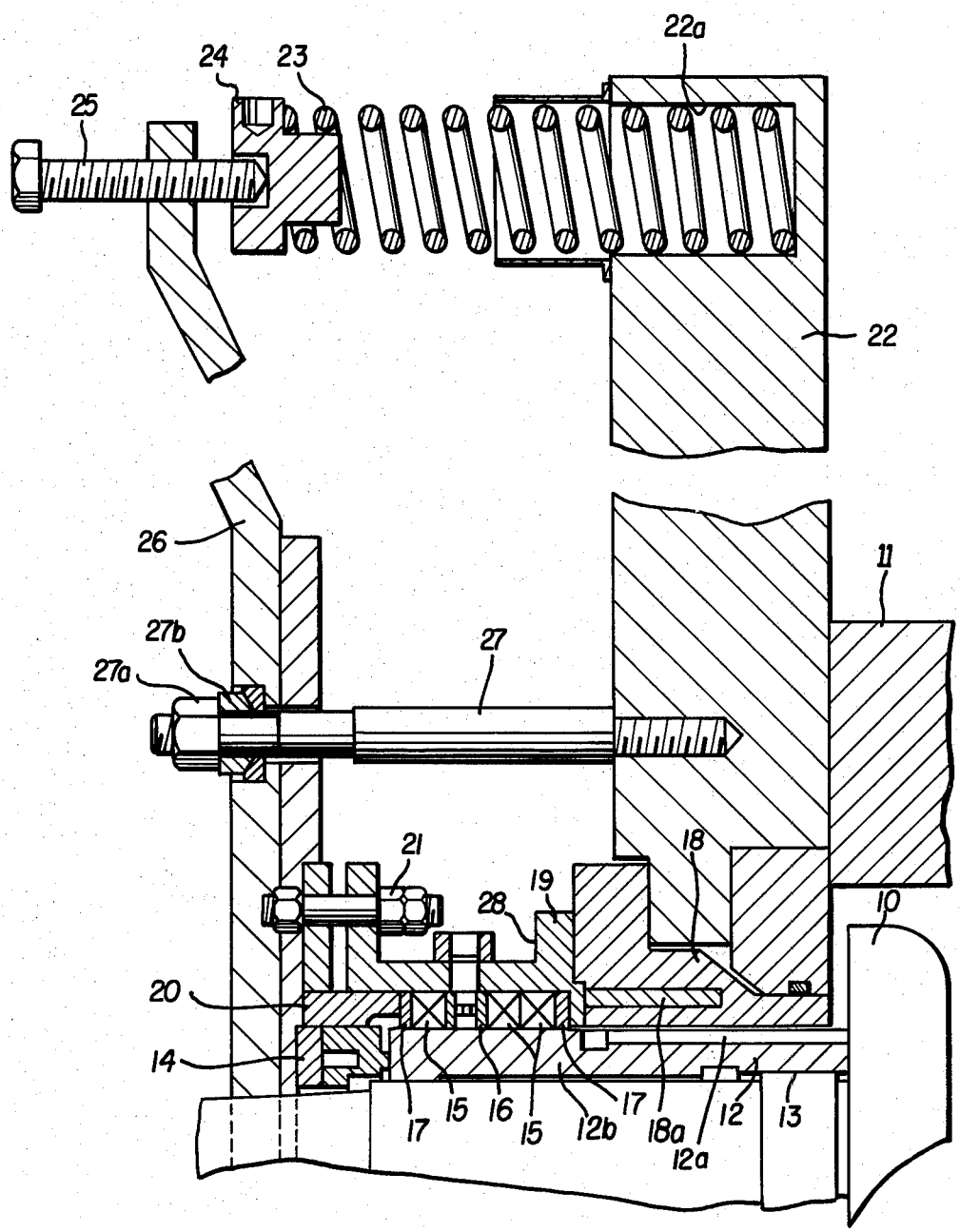
FIG. 4 is an enlarged side view showing the essential portion of the shaft sealing mechanism according to this invention.

The shaft sealing mechanism according to this device will now be described with reference to FIG. 4 showing one embodiment.

FIG. 4 is a vertical section side view of an essential portion of the shaft sealing mechanism of this device as mounted on the rotor shaft. Denoted 10 in this figure is the rotor shaft (for mixing) installed in the mixing chamber 11. (The general construction of the kneading machine is well known in the art and is omitted here).

Designated 10a is an end portion of the mixing rotor shaft 10 which is supported at a supporting mechanism (not shown). A reverse screw member 12 secured on the outer surface of the rotor shaft end portion 10a by means of the thread 13 has a reverse screw portion 12a of a proper length formed at one end contacting the rotor shaft end surface, and at the other end has a smooth portion 12b on which is installed a gland packing member which will be further described.

A seal ring 14 is mounted on the outer surface of the rotor shaft end portion 10a in such a manner as to contact the end surface of the smooth portion 12b of the reverse screw member. A gland packing 15 is mounted on the outer surface of the smooth portion of the reverse screw member, and has a lantern ring 16 in its middle. Spacers 17 are fitted to both ends of the gland packing 15.

A housing member 18 with a heating or cooling jacket 18a is supported by a supporting member which will be further described, in such a manner that it is located on the screw portion 12a of the screw member 12.

Denoted by 19 is a gland packing housing which fits tightly onto the outer surface of the gland packing portion 15 and which is secured to the end surface of the housing member 18 by fixing means such as bolts. Element 20 is a seal ring holder which is placed on the outer surface of the seal ring 14. In this embodiment, the seal ring holder 20 contacts the inner surface of the gland packing housing 19, and at the same time their radial opposing end portions are secured together by clamping means such as bolts 21. The seal ring holder 20 and the gland packing housing 19 can be separated by removing the clamping means 21.

Element 22 is a supporting member which receives the housing member and has recessed portions 22a formed at the outer end in which a compression spring 23 is received. A washer is fitted on the top of the compression spring 23 installed in the recessed portion 22a.

Element 25 is a bolt abutting at the front end against the washer 24 and which extends transversely through the upper end of a retaining member 26 and is secured to the supporting member 22 by means of a stud bolt 27.

The condition of the gland packing 15 can easily be adjusted by tightening or loosening the bolt 21.

The surface pressure at the sealing portion A can easily be adjusted by turning the bolt 25 to change the spring pressure which is applied to the seal ring 14 with the stud bolt 27 acting as a fulcrum.

Now, the manner in which the mixing rotor is disassembled and cleaned will be detailed.

First, the casing portion forming the mixing chamber of the kneading machine is moved axially to expose the mixing rotor.

Next, the nut 27a and the washer 27b on the stud bolt 27 are removed to release the supporting member 22 and the retaining member 26 from each other. This allows the washer 24 and the compression spring 23 installed on the supporting member 22 to be removed freely. Removing the stud bolt 27 and the bolt 28 connecting the gland packing housing 19 and the housing member 18 will allow disassembling of the parts mounted on the shaft end portion 10a, such as the gland packing housing 19, the seal ring holder 20, the seal ring 14, the gland packing 15, the lantern ring 16, the spacers 17, and so on.

When the disassembling of the rotor shaft sealing mechanism is completed, the rotor can easily be removed and cleaned. In assembling the sealing mechanism, the reverse procedure should be followed.

In summary, this device comprises a reverse screw member mounted on the outer surface of the rotor shaft end, the reverse screw member having a reverse screw portion of a predetermined length; a housing member secured around the reverse screw portion of the reverse screw member by a supporting member; a gland packing material mounted on that portion of the outer surface of the reverse screw member on which no reverse screw is formed, the gland packing material being held in place by a holder fastened to a retaining member; and a resilient member installed on the supporting member for resiliently connecting the supporting member and the retaining member. This construction enables an easy assembling and disassembling of the sealing mechanism and provides the following advantages over the conventional rotor shaft sealing mechanism.

(1) Particles produced from the wear of the sliding seal surfaces can be completely prevented from getting into the mixing chamber by the reverse screw member.

(2) The leakage of the material being mixed in the mixing chamber is blocked in three steps, i.e., by the reverse screw member, the gland packing member, and the spring-loaded compression member. Thus, no content will leak out.

(3) Further, sealing surfaces are constructed of dry seals. This prevents the content from being polluted by lubricating oil.

In this way, the rotor shaft sealing mechanism of this device can not only perform the ideal sealing function but can also be assembled or disassembled very easily.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A rotor shaft sealing mechanism for a synthetic resin kneading machine, comprising:
    a rotor shaft having an end;
    a reverse screw means mounted on said rotor shaft end, said reverse screw means including a reverse screw portion of a predetermined length and a second portion;
    a housing means;
    a supporting means securing said housing means around said reverse screw portion;
    a gland packing mounted on said second portion of said reverse screw means;
    a holder means contacting said gland packing and maintaining said gland packing on said second portion;
    a retaining means;
    a seal means disposed between said reverse screw means and said retaining means; and
    resilient means extending between said supporting means and said retaining means for resiliently connecting said supporting and retaining means, whereby said retaining means resiliently contacts said seal means.

2. The mechanism of claim 1 wherein said gland packing removably installed on said second portion and said resilient means is removably installed between said supporting and retaining means whereby said mechanism may be disassembled.

3. The mechanism of claim 1 wherein said retaining means is secured to said supporting means by means of a stud bolt disposed between said retaining means and said supporting means.

* * * * *

UNITED STATES PATENT AND TRADEMARK OFFICE
CERTIFICATE OF CORRECTION

PATENT NO. : 4,291,888
DATED : Sep. 29, 1981
INVENTOR(S) : TAKEHIKO TANAKA ET AL

It is certified that error appears in the above-identified patent and that said Letters Patent are hereby corrected as shown below:

On the title page Insert:

[30]---Foreign Application Priority Data

Jan. 24, 1979 [JP] Japan......54-8089 --.

Signed and Sealed this

Nineteenth Day of January 1982

|SEAL|

*Attest:*

GERALD J. MOSSINGHOFF

*Attesting Officer* — *Commissioner of Patents and Trademarks*